United States Patent
Clausse et al.

(10) Patent No.: US 7,404,898 B2
(45) Date of Patent: Jul. 29, 2008

(54) METHOD AND INSTALLATION FOR THE PRODUCTION OF LIME WATER FROM DEIONISED WATER

(75) Inventors: Franck Clausse, Bois-Colombes (FR); Philippe Marteil, Vigny (FR); Germain LeBouc, Chartres-de-Bretagne (FR); Frederic LeFort, Peronne Cedex (FR)

(73) Assignee: OTV SA (FR)

( * ) Notice: Subject to any disclaimer, the term of this patent is extended or adjusted under 35 U.S.C. 154(b) by 555 days.

(21) Appl. No.: 10/522,636

(22) PCT Filed: Jul. 23, 2003

(86) PCT No.: PCT/FR03/02338

§ 371 (c)(1),
(2), (4) Date: Mar. 14, 2005

(87) PCT Pub. No.: WO2004/014807

PCT Pub. Date: Feb. 19, 2004

(65) Prior Publication Data

US 2005/0247626 A1    Nov. 10, 2005

(30) Foreign Application Priority Data

Jul. 26, 2002   (FR) .................................. 02 09574

(51) Int. Cl.
*B01D 61/58* (2006.01)

(52) U.S. Cl. ................ 210/650; 210/652; 210/663; 210/664; 210/665; 210/709; 210/716; 210/738; 210/806

(58) Field of Classification Search .................. 210/85, 210/96.1, 96.2, 175, 177, 198.1, 202, 259, 210/321.6, 638, 639, 641, 650–652, 663–669, 210/774, 806, 696–701, 749, 709, 716, 738, 210/804; 502/411
See application file for complete search history.

(56) References Cited

U.S. PATENT DOCUMENTS

| | | | | |
|---|---|---|---|---|
| 1,574,363 A * | 2/1926 | Calvert | ...................... | 502/411 |
| 3,013,981 A * | 12/1961 | Riede | .......................... | 502/411 |
| 4,670,150 A * | 6/1987 | Hsiung et al. | ................ | 210/636 |
| 5,868,924 A * | 2/1999 | Nachtman et al. | ............. | 210/85 |
| 6,036,867 A * | 3/2000 | Jogand et al. | ................ | 210/696 |
| 7,273,558 B2 * | 9/2007 | Miecznik | .................... | 210/696 |

FOREIGN PATENT DOCUMENTS

WO    WO 01/85620    * 11/2001
WO    WO01/96240    12/2001

* cited by examiner

*Primary Examiner*—Joseph W Drodge
(74) *Attorney, Agent, or Firm*—Coats & Bennett, P.L.L.C.

(57) ABSTRACT

A method of producing lime water comprising deionising dilution water by membrane filtration, distillation or an ion exchange resin and adding silicate ions to the deionised water. Thereafter, the deionised water treated with the silicate ions is mixed with milk of lime to form lime water. In one embodiment, the milk of lime and dilution water are mixed in a saturator where the silicate ions are introduced.

13 Claims, 1 Drawing Sheet

METHOD AND INSTALLATION FOR THE PRODUCTION OF LIME WATER FROM DEIONISED WATER

Figure 1:
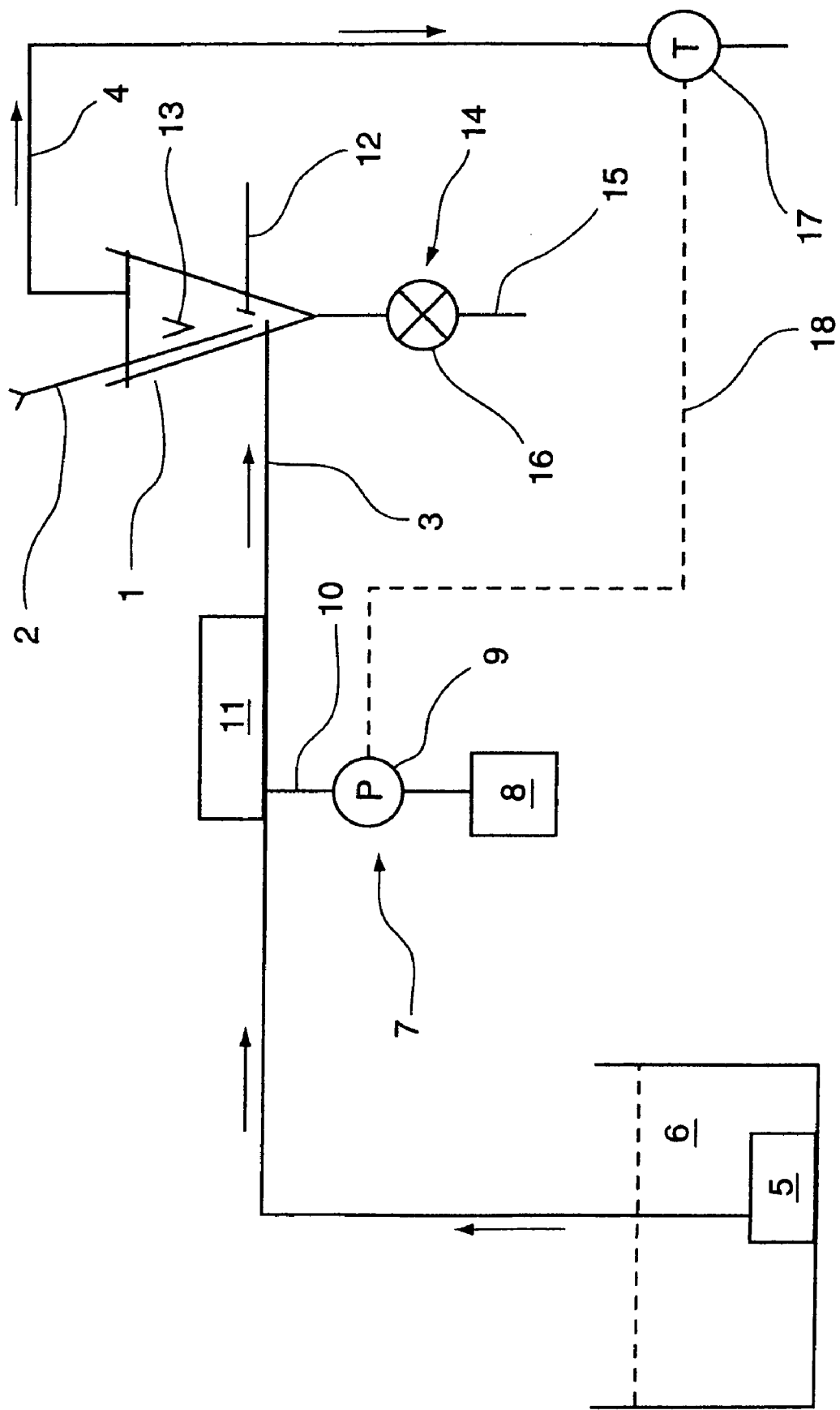

This application is a U.S. National Stage application of PCT Application No. PCT/FR03/02338, with an international filing date of Jul. 23, 2003. Applicant claims priority based on French application serial no. 02 09574 filed Jul. 26, 2002.

The invention relates to the domain of water treatment.

More precisely, the invention relates to the domain of production of lime water for use in remineralising water with low mineral content and more precisely water that has been subjected to a deionisation step either by membrane filtration (of the reverse osmosis, nanofiltration type), or by distillation, or by passage on an ion exchange resin.

This water may be slightly or not at all mineralised, and has the disadvantage of being corrosive and therefore inducing degradation to installations used for transport or treatment of the water.

Furthermore, this water has a high equilibrium pH value, in the sense of calcocarbonic equilibrium of the water. This high value is incompatible with good efficiency of some disinfectants such as chlorine. Therefore, the water should be remineralised in order to reduce the equilibrium pH value.

In the remineralisation method, it is known that a base, and particularly limewater, can be added to the water.

Special devices called "saturators" have to be used due to the low solubility of lime in water, so as to obtain a limewater with constant titre enabling precise dosage.

Ideally, the objective is thus to produce quality lime water using such saturators, with a titer in practice of about 220° F. TAC (total alkali strength) at a temperature of 20° C., namely 1.65 g/liter of $Ca(OH)_2$ with a turbidity less than 10 NTU. Due to its clarity, this type of limewater in the form of a saturated solution may be mixed with water to be treated to efficiently remineralise it using gaseous $CO_2$.

Conventionally, saturators receive firstly a quantity of lime in the form of milk of lime (of the order of 20 to 100 g/liter) injected into the saturator base or into a mixing chamber internal to or external to the saturator, and secondly dilution water (water to be saturated by lime). Additional water, called "spraying water", is used to adjust the production rate and improve the mixing quality. Lime is brought in liquid form as milk of lime and is dissolved as it rises into the saturator, generating a fraction of calcium carbonates and other insoluble particles which can be continuously or discontinuously purged.

Conventionally, the dilution water used to dilute the milk of lime in the saturator is mineralised water or water that has been subjected to a remineralisation treatment. In the rest of this description, we will call this water "non-deionised water", and it has simply been subjected to a so-called "non-deionising" filtration either by granular filtration on sand, or sometimes by micro-filtration or ultra-filtration, which has the disadvantage that it does not retain dissolved or undesirable molecules such as pesticides or nitrates. When included in the limewater designed to remineralise the deionised water, this water contributes to polluting it to a certain extent, admittedly not in large quantities but nevertheless undesirable. It is then possible to eliminate pesticides and/or nitrates from this water by a combination of means such as active carbon and biological denitration or denitration on resins, but the easiest way is often to use deionised water produced by the plant directly.

However, it has been observed that the use of deionised water that has either been thoroughly membrane filtered, or distilled, or water that has been subjected to a treatment with ion exchanging resins to produce lime water, instead of water on which only a non-deionising filtration has been carried out, led to the production of a lime water that quickly became cloudy due to precipitation of carbonates originating from atmospheric or dissolved $CO_2$. The turbidity of this type of limewater produced in this way from water that is very little or not at all mineralised can conventionally be between 50 and 100 NTU. This type of turbidity prevents its use during the remineralisation step of water on which a thorough membrane filtration has been carried out.

One purpose of this invention is to propose a new method for production of limewater from deionised water leading to a limewater from which all undesirable pesticide or nitrate type molecules have been removed, and in general from which all molecules not eliminated by non-deionising filtration have been removed.

Another purpose of this invention is to have lime saturators with efficiency greater than lime saturators supplied with filtered water. Saturator yields are conventionally between 75 and 95%, in other words the lime loss can be as high as 25%.

Another purpose of this invention is to present such a method to obtain limewater with a turbidity less than 10 NTU for a saturator efficiency greater than 95%.

Yet another purpose of this invention is to describe such a method that can be used in a lime saturator that is only slightly different from the lime saturator according to prior art.

These different objectives are achieved by the invention that relates to a method for production of lime water comprising a step in which milk of lime is mixed with dilution water, characterised in that the said dilution water is water deionised by membrane filtration or by distillation or by passage on an ion exchanger resin, and in that it includes a preliminary step consisting of adding silicate ions to the said deionised water.

Surprisingly, it has been observed that the use of silicate ions provides a means of obtaining a limewater with low turbidity and good saturation efficiency. Moreover, use in this way as dilution water for water that has been deionised, considerably reduces the probability of finding undesirable molecules in the water remineralised using limewater obtained using this method.

The use of such a compound can improve flocculation and precipitation, resulting in improved surface velocities greater than 2 m/h.

It should be noted that in the context of the method according to the invention, a silicate is used in preference chosen from the group composed of sodium silicate and potassium silicate, and that in preference, sodium silicate which has a lower treatment cost will be used.

As indicated above, the dilution water used in the context of the method according to the invention is not water that has been subjected to a coarse non-deionising filtration, but is water on which a thorough membranes filtration has been carried out or which has been distilled. This thorough membranes filtration may be a nano-filtration or a filtration by reverse osmosis.

Different means could be envisaged to add silicate ions to the deionised water. According to one variant, this addition step will be used mixing this compound. According to another variant, silicate will be introduced into the said saturator.

Furthermore, it should also be noted that silicate will be added to dilution water or into the saturator, preferably at a content of 5 mg/l to 40 mg/l, and preferably 10 to 20 mg/l, of $SiO_2$ with respect to the dilution water.

This invention is also intended to cover any installation for the production of limewater using the method described above comprising an installation for the production of lime water using the method described above, the said installation comprising:

at least one lime saturator, means of bringing the dilution water into the said lime saturator, means of bringing milk of lime into the said lime saturator, means of evacuating the limewater obtained by bringing the milk of lime into contact with the dilution water, means of evacuating unburnt materials and/or precipitates, characterised in that it includes conveyance means for bringing silicate ions into the dilution water or into the saturator using a specific pipe.

Therefore the installation according to this invention is distinguished from classical installations in that it includes additional means of bringing silicate ions into the deionised dilution water.

Preferably, this installation also includes means of mixing silicate ions in the dilution water which, in the method according to the invention, is composed of ionised water on which a thorough membrane filtration has been carried out, or distillation, or treatment by passage on an ion exchanger resin.

Preferably, these mixing means capable of diluting silicate ions in dilution water include at least one mixing system which may be a static mixer or a mixing tank.

Finally, it should be noted that according to one variant of the invention, the installation also includes means of measuring the quality of limewater produced in the saturator and means of varying the silicate dose brought in by the conveyance means in the dilution water. Such measurement means may for example include a turbidimeter and/or a pH meter and/or conductivity measurement means.

This type of means can be used to add the silicate in just the right quantity to obtain the required quality of limewater produced using the installation.

The method and the installation according to this invention can be used to obtain lime water with turbidity less than 10 NTU with a saturation efficiency equal to at least 95%, that can be perfectly suitable for remineralising water on which a membrane filtration, or distillation, or resin treatment method has been carried out.

The invention also relates to any use of limewater obtained using the method described above in the context of a method to remineralise water to be remineralised by the addition of limewater and carbon dioxide.

The invention and its various advantages will be better understood after reading the following description of a non-limitative embodiment of the invention with reference to FIG. 1 that shows a diagrammatic view of an installation for the treatment of water on which a membrane filtration method has been carried out.

FIG. 1 illustrates an embodiment that includes a water reservoir, lime saturator and mixer.

In FIG. 1, the installation comprises a lime saturator 1, means 2 of conveying the milk of lime into the said lime saturator 1, means 3 of conveying dilution water into the lime saturator, means 4 of eliminating the lime water obtained by bringing the milk of lime into contact with the dilution water in the lime saturator 1. It should be noted that conventionally, the lime saturator 1 also comprises a spraying water inlet 12 injecting water to facilitate mixing between the milk of lime and the dilution water. This lime saturator is also provided with a carbonates and insolubles trap 13 to evacuate carbonates formed in the lime saturator, and means 14 of evacuating sludge formed in the lower part of the saturator including an evacuation pipe 15 and a pump 16.

According to this invention, dilution water is composed of water that has been thoroughly membrane filtered, in this case nano-filtered water pumped by a pump 5 in a nano-filtered water reservoir 6.

Also according to this invention, the installation includes means 7 of bringing silicate ions into the dilution water. These means include a silicate reservoir 8, a pump 9 and a pipe 10.

Also according to this invention, the silicate ions are mixed with dilution water, for example using a static mixer 11, before this mix is added into the lime saturator 1. In the context of this embodiment, a static mixer 11 is used.

Also according to this invention, a turbidimeter 17 is provided on means 4 intended for evacuating limewater formed in the lime saturator 1, and means 18 of varying the silicate dose brought by means 7 for conveying this compound in the dilution water, are also provided.

This installation was tested using potassium silicate and sodium silicate. The concentration of silica, and the density and consistence of these reagents are shown in Table 1 below.

TABLE 1

| Silicate | Concentration of $SiO_2$ | Density |
|---|---|---|
| sodium | 25 | 1.36 |
| potassium | 22.6 | 1.29 |

The total alkali strength (TAC) of lime water produced according to the invention was measured and compared with the TAC of lime water obtained conventionally, using water that has been subjected to a non-deionising filtration such as granular filtration on sand for production of lime water, rather than dilution water composed of water on which a membrane filtration has been carried out.

The coverage ratio of the TAC of limewater produced according to this invention, is measured and compared with the TAC of limewater obtained according to the state of the art. The turbidity at equilibrium of limewater obtained was also measured.

For potassium silicate, limewater production tests with additions of 0, 5, 6 and 20 mg/l of $SiO_2$ were carried out.

For sodium silicate, limewater production tests with additions of 0, 3, 9 and 32 mg/l of $SiO_2$ were carried out.

Tables 2 and 3 below show the results obtained for potassium silicate and sodium silicate respectively, with deionised dilution water.

TABLE 2

| Potassium silicate content (in ppm of $SiO_2$) | Turbidity at equilibrium (NTU) | TAC coverage ratio compared with TAC obtained according to prior art (in %) |
|---|---|---|
| 0 | >50 | / |
| 5 | 9 | 95-100 |
| 6 | 7 | 95 to 100 |
| 20 | 5 | 95 to 100 |

TABLE 3

| Sodium silicate content (in ppm of SiO$_2$) | Turbidity at equilibrium (NTU) | TAC coverage ratio in comparison with TAC obtained according to prior art (in %) |
| --- | --- | --- |
| 0 | >50 | / |
| 3 | 12 | 95-100 |
| 9 | 7 | 95 to 100 |
| 32 | 5 | 95 to 100 |

The addition of silicate according to this invention systematically causes precipitation of CaH$_2$SiO$_4$. Precipitates of this compound, in the form of 1 to 3 mm diameter flocs, settle at the bottom of the saturator, making the limewater clear. The quantity of flocs increases as the silicate content increases. This type of flocculation forms a complete substitute for cloudiness that can be caused by calcium carbonates when no silicate compound is added, in other words when membrane filtered water or distilled water is used for the production of limewater. The limewater between the flocs is perfectly clear when reagents according to the invention are added. When these compounds are not added, the limewater becomes cloudy and milky and its turbidity increases to about 50 NTU.

TAC measurements on the lime water produced from water on which a nano-filtration has been carried out gave results systematically between 210° F. and 230° F., and were always of the same order as results obtained on lime water produced according to the state of the art, from water filtered on sand. The calculated coverage ratio was thus always between 95% and 100%.

It should be noted that the embodiment of the invention described herein is not intended to reduce the scope of the invention.

The invention claimed is:

1. A method of producing lime water and remineralizing water comprising:
    a. deionising dilution water by membrane filtration, distillation or an ion exchange resin;
    b. mixing silicate ions with the deionised dilution water at a silicate ion injection site to produce a silicate ion-water mixture;
    c. after mixing silicate ions with the deionised dilution water and downstream from the silicate ion injection site, mixing milk of lime with the silicate ion-water mixture in a saturator to form lime water;
    d. precipitating solids in the lime water, wherein the precipitation is caused by the addition of silicate ions and milk of lime to the deionised dilution water;
    e. settling precipitated solids to form sludge in the saturator;
    f. discharging sludge formed in the saturator; and
    g. remineralizing water to be treated by mixing carbon dioxide and the lime water into the water to be treated.

2. The method of claim 1 wherein said silicate ions are produced from silicates selected from the group consisting of sodium silicate and potassium silicate.

3. The method of claim 2 wherein the silicate ions are produced from sodium silicate.

4. The method of claim 1 wherein the dilution water is deionised by membrane filtration including nano-filtration or reverse osmosis.

5. The method of claim 1 wherein mixing the silicate ions with the deionised dilution water produces the silicate ion-water mixture with a concentration of approximately 5 mg/l to 40 mg/l of silicate ions.

6. The method of claim 1 wherein silicate ions are mixed with the deionised dilution water with a static mixer or mixing tank.

7. The method of claim 1 including measuring the quality of lime water produced in the saturator and varying the silicate ion dosage.

8. The method of claim 7 wherein the lime water quality is measured with a device taken from the group consisting of a turbidimeter, a pH meter, and a conductivity meter.

9. The method of claim 1 including precipitating CaH$_2$SiO$_4$ in the lime water.

10. The method of claim 1 including mixing a sufficient amount of silicate ions with the deionised dilution water such that when the silicate ion-water mixture is mixed with milk of lime the resulting lime water has a turbidity of less than approximately 10 NTU.

11. The method of claim 1 wherein the milk of lime and the silicate ion-water mixture are mixed by spraying water into an inlet of the saturator.

12. The method of claim 1 wherein the silicate ions are produced from silicates selected from the group consisting of sodium silicate and potassium silicate, wherein mixing the silicate ions with the deionised dilution water produces the silicate ion-water mixture with a concentration of approximately 5 mg/l to 40 mg/l of silicate ions, and wherein mixing the milk of lime with the silicate ion-water mixture forms lime water with a turbidity of less than approximately 10 NTU.

13. The method of claim 1 including:
    a. deionising dilution water with a nano-filter or reverse osmosis membrane;
    b. mixing silicate ions and the deionised dilution water with a static mixer or mixing tank to produce the silicate ion-water mixture prior to the silicate ion-water mixture being directed into the saturator;
    c. injecting a water spray into the saturator to mix the milk of lime and the silicate ion-water mixture; and
    d. evacuating insoluable particles formed in the lime water with an insoluables trap associated with the saturator.

* * * * *